United States Patent [19]

Yang

[11] 4,337,071

[45] Jun. 29, 1982

[54] AIR PURIFICATION SYSTEM USING CRYOGENIC TECHNIQUES

[76] Inventor: Lien C. Yang, 2107 Normanton Dr., La Canada, Calif. 91011

[21] Appl. No.: 63,143

[22] Filed: Aug. 2, 1979

[51] Int. Cl.³ ............................................... F25J 3/04
[52] U.S. Cl. ......................................... 62/37; 62/40; 62/14
[58] Field of Search ............. 62/18, 40, 21, 37, 12–15; 55/80

[56] References Cited

U.S. PATENT DOCUMENTS

| | | | |
|---|---|---|---|
| 2,084,987 | 6/1937 | Borchardt et al. | 62/21 |
| 2,545,194 | 3/1951 | Colburn et al. | 62/12 |
| 3,058,314 | 10/1962 | Gardner | 62/40 |
| 3,093,470 | 6/1963 | Melikian et al. | 62/12 |
| 3,319,427 | 5/1967 | Cimler et al. | 62/40 |

Primary Examiner—Norman Yudkoff
Attorney, Agent, or Firm—Norman L. Chalfin

[57] ABSTRACT

An on-site apparatus that produces cryogenic temperatures is used to remove, by condensation, all pollutants in the air so that an ultra clean air supply is obtained for human consumption in the interior of living enclosures, such as automobiles, homes, offices, hospitals etc. In accordance with one embodiment of the invention, it can recycle the air in the enclosure, i.e. resupply the oxygen consumed by the human being and remove the carbon dioxide produced by respiration. The cryogenic temperatures are produced by a closed-cycle operated refrigeration system consisting of a compressor, a Joule-Thompson valve (JTV), multi-stage heat exchangers and expanders. Cold traps (filters) of different cryogenic temperatures are built into the system to condense pollutants of different condensation temperatures. The condensed pollutants can be disposed of by periodical defrost and purge of the system.

15 Claims, 2 Drawing Figures

AIR PURIFICATION SYSTEM USING CRYOGENIC TECHNIQUES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention generally relates to a technique and apparatus for passive air pollution control. More particularly, the present invention concerns a cryogenic system for producing on-site cryogenic temperatures for condensation and filtering of the pollutants in the air.

BACKGROUND OF THE INVENTION AND DESCRIPTION OF THE PRIOR ART

Air pollution in the urban and industrial areas is a severe problem of the nation, due to the exhaust products of the factories and automobiles. It is further aggravated with the use of low quality fuels, caused by the perennial energy shortage. While the fundamental solutions would involve formidable expenditures and long-term technological development, there is an urgent need for on-site, low cost systems that can purify the air for use in enclosed living spaces (automobiles, homes, offices, hospitals etc.) The current state-of-the-art method for air purification is effected by using filters containing substances such as activated charcoal and a variety of chemicals. The shortcomings of such devices are twofold: First, they can only remove a limited number of pollutants, and secondly, the process is irreversible, therefore periodic replacement of the devices is necessary which contributes to the high cost of this type of system. Life supporting systems and artificial enviroments based upon pressurized pure air/oxygen bottle supply have been used in manned space exploration, diving, and medical applications. The main problem in extending this technology for general use is again the factor of high cost. It is estimated that more than 90% of the cost is due to the transportation and distribution of the heavy bottles used to contain the high pressure gaseous material from the factory to the site of application.

This invention proposes to produce pure air or oxygen at the site of application by cryogenic techniques, thereby achieving cost effectiveness. The cryogenic technique is chosen, because it is much more efficient than other techniques such as, for example electrolysis of water. The technical background of the invention is easy to appreciate as briefly summarized below:

The first important advantage of the system is the efficiency of cryogenic refrigeration, which includes a compressor, defined as the cooling power divided by the power required to operate the compressor. It depends somewhat upon the size of the system. For instance, a large scale refrigerator such as is used in an industrial air liquefier has an efficiency of the order of 30%. Highly portable, light weight refrigerators for aerospace application have efficiencies on the order of 2 to 4 percent. Thus, the efficiency of a system for automobiles, homes, etc. will be somewhere in between these values. This relative inefficiency is offset by the fact that the human respiratory need for air/oxygen is comparatively low. It is estimated that a normal person consumes about 0.063 pounds of oxygen per hour. Based upon the ideal work of obtaining oxygen gas through liquefaction of oxygen at 170 BTU/lb and the current cost of energy, the operating cost per person per hour of the system is less than one cent. Thus it is economical.

The second important advantage of the cryogenic filter is in the thermal properties of air (oxygen/nitrogen) and the major gaseous pollutants contained in it. The melting/boiling points in centigrades (°C.) of these substances are listed as follows:

TABLE I

|  | $N_2$ | $O_2$ | NO | $NO_2$ | $N_2O$ | CO |
|---|---|---|---|---|---|---|
| Melting point, °C. | −209.8 | −218.4 | −163.6 | −9.3 | −102.4 | −207 |
| Boiling point, °C. | −195.8 | −182.9 | −151.8 | 21.3 | −88.5 | −190 |

|  | $NH_3$ | $SO_2$ | $SO_3$ | $H_2S$ | $H_2S_2$ | $CO_2$ |
|---|---|---|---|---|---|---|
| Melting point, °C. | −74 | −75.5 | 16.8 | −62.0 | −82.9 | −78.5 |
| Boiling point, °C. | −30.9 | −10.0 | 44.8 | −42.0 | −61.8 | — |

|  | HF | HCl | $CF_4$ | $CH_4$ | $C_2H_4$ |
|---|---|---|---|---|---|
| Melting point, °C. | −92.3 | −112 | −184 | −184 | −169.4 |
| Boiling point, °C. | 19.4 | −83.7 | −128 | −161.5 | −103.9 |

From these data, it is evident that if the polluted air containing these gaseous pollutants is being filtered by a cryogenic filter at a cryogenic temperature between −180° and −184° C., all the pollutants perhaps besides carbon monoxide (CO) will be condensed on the filter in liquid or in solid form, and thus removed from the air. There are also evidences (reference I) that due to its larger electrical dipole moment, the CO molecule shows a much larger physical adsorption than nitrogen and oxygen over this temperature range in a number of porous materials such as activated carbon, therefore it can be also effectively removed. It is also well-known that hydrocarbon emissions from automobiles, such as parafins, olefins and aromatics, have larger molecular weights, and consequently higher boiling and melting points. They can be handily condensed and removed from the air by the cryogenic filter.

OBJECTS AND SUMMARY OF THE INVENTION

Accordingly, it is a primary object of the present invention to utilize cryogenic techniques and apparatus for on-site purification of air for human respiratory consumption in a living enclosure, such as automobile, home, office, hospital etc.

It is another object of the present invention to utilize cryogenic techniques and apparatus for onsite production of pure oxygen for human respiratory consumption in a living enclosure, such as automobile, home, office, hospital etc.

It is a further object of the present invention to use a combination of the objects mentioned above to make possible the recycling of the air in the living enclosures mentioned above.

It is another further object of the present invention to provide a system, including a number of monitoring and control devices, so that the technique and apparatus are safe to operate.

It is still another further object of the present invention to provide means to increase efficiency, save energy and miniaturize the apparatus and/or system.

To sum up, the present invention involves a technique and apparatus for cryogenic processing of air to purify it for human respiratory consumption in a living enclosure.

In accordance with one embodiment of the invention, a closed-cycle operated cryogenic refrigerator is provided which can produce a cryogenic temperature in a small container filled with a filter element. The refrigerator consists of a gas compressor, a JTV (Joule-Thomson Valve), multi-stage heat exchangers and expanders, and a cold end attached to the container. Polluted air from the atmosphere is pumped into the container. The pressure of the air and the cryogenic temperature are maintained at the values such that the major part or all of the gaseous pollutants are condensed on the filter and thereby removed from the air. The air free of pollutants is then fed into the living enclosure. In order to increase the operation efficiency, it is desirable to let the purified cold air pass through a series of heat exchangers to pre-cool and pre-filter the incoming polluted air, prior to its discharge into the enclosure. The air in the enclosure, after being partially consumed by human respiration, can be either released to the atmosphere, or directly coupled to the inlet of the system, to combine with the inlet air for purification. The condensed pollutants can be disposed of by defrosting and purging with air.

The capacity of the purification system should be adequate for the maximum number of persons living in the enclosure. A number of monitoring devices, such as oxygen and carbon dioxide concentration gauges, are installed in the enclosure, to control the operation of the system, mainly the average air flow rate or duty cycle of the system.

In another more sophisticated and novel embodiment of the invention, the cryogenic temperature and the pressure of the inlet air are set at values such that the oxygen in the air is being liquefied thereby separately. The pure oxygen (or oxygen rich) liquid is then led through the heat exchangers, to form an oxygen gas output to be fed into the enclosure. The exhaust air from the enclosure, which contains an excessive amount of carbon dioxide, is then directly coupled to the inlet of the system. By using the control techniques described previously, the system can be operated in a recyclable manner, i.e. to synchronize the replacement of oxygen and the removal of carbon dioxide due to human respiration. Thus it minimizes the need for purifying polluted air from the atmosphere and, therefore, increases operational efficiency.

Further objects and many attendant advantages of the invention may be best understood from the following detailed descriptions when read in conjunction with the accompanying drawings.

DESCRIPTION OF THE PREFERRED EMBODIMENTS

Figure 1:
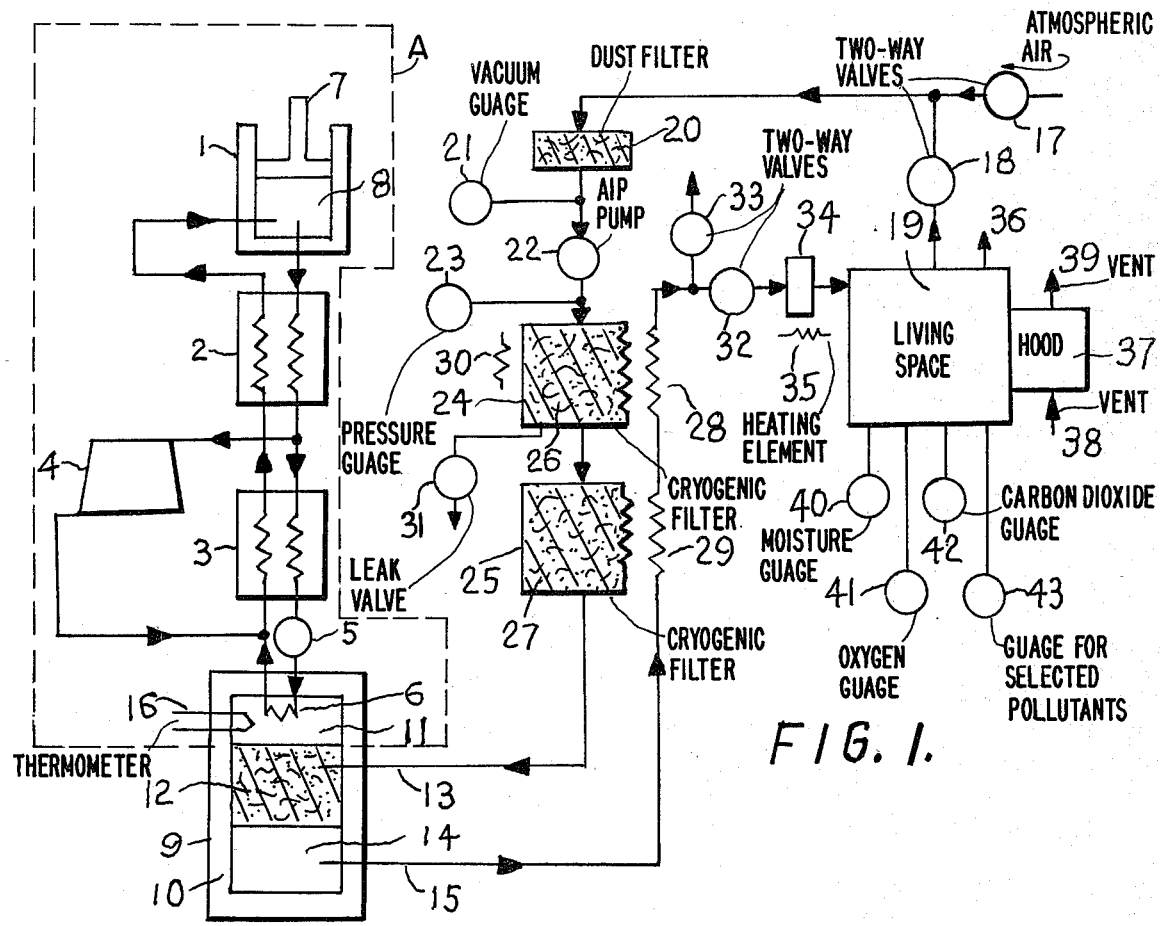
FIG. 1 is a block diagram illustrating a preferred embodiment of the present invention.

FIG. 1 is a block diagram, illustrating a close-cycle cryogenic refrigerator, used to generate a low temperature for the purpose of purifying polluted air by condensation of. Shown on the left hand side of the figure is a state-of-the-art cryogenic refrigerator, as shown in dashed outline at A in the drawings of FIG. 1 and 2. It consists of a compressor 1, heat exchangers 2 and 3, a gas expander 4, a Joule-Thompson valve (JTV) 5 and a cold end output element 6. A piston 7 in the compressor 1 can be driven either by an electrical motor or by a mechanical motor such as available in an automobile. Compressor 1 compresses a working gas 8, for example nitrogen or helium, to flow through the high temperature side flow path in the exchangers 2 & 3, shown in zigzag lines, to be cooled down. The exchangers shown there are of the counterflow type made of metal tubes, perhaps with fin structures attached to obtain a large surface area for heat exchange efficiency. Then the gas is expanded through the JTV 5 for further adiabatic cooled down according to the law of thermodynamics for a throttled expansion. The cold gas so obtained is used to refrigerate the interior of the main air purification chamber 9. In this process, the gas is warmed up and flows through the low temperature and low pressure side flow paths in the exchangers 2 & 3, also shown as zigzag lines. Finally it is re-introduced into the compressor 1 for the next cycle of operation.

The purpose of using an expander 4 is to increase the efficiency of the refrigerator, because it is known by the laws of thermodynamics that cool down of a pressurized gas can be achieved, if it is used to perform mechanical work, such as driving a gas turbine in an expander. It is understood that the entire refrigerator, apart from the compressor, is properly insulated. The number of exchangers and expanders can be more than that shown in the figure. It is determined by the compromise between the high cooling efficiency desired and the low cost of manufacturing these components. The foregoing descriptions are well within the current knowledge of cryogenic refrigerators. Further details are, therefore, can be found in the literature appropriate to these devices. It is envisaged, however, that for the present invention, a refrigerator should be compact in size so that it is easily installed in automobiles or homes. It is also desirable that the refrigerator have a high efficiency so that energy saving and lower cost of operation can be achieved. Future improvements in these areas will be beneficial to the application of the invention.

Shown in the FIG. 1, the main air purification chamber 9 is made of metal walls and is shielded by thermal insulator 10 which can be made from porous materials such as plastic foams or a high vacuum jacket. The cold end output element 6 of the refrigerator is coupled to a copper block 11. The element, shown as zigzag lines, could be simply a copper tube imbedded in the block, and therefore directly cools the latter. This thermal coupling mechanism is efficient due to the known high thermal conductivity of copper at cryogenic temperatures. Directly underneath the block, there is attached a cryogenic filter 12, used to capture the condensable impurities in the air supplied by the inlet pipe 13. The filter is porous and has high thermal conductivity so that a relatively uniform cryogenic temperature can be maintained by its physical attachment to the copper block 11. Examples of materials for construction of such type of filter are: packed metal wool or ribbons, sintered metal or ceramic blocks and powdery materials. Metals such as copper, aluminum etc and ceramics such as aluminum oxide can be used. Powdery materials such as zeolites and activated carbon though have desirable large surface area but poor thermal conductivity. They have, therefore, to be used with metal elements (metal ribbons, metal stripes) imbedded in them to achieve good thermal conduction. The filter should have reasonable porosity and path length for air to travel in order to achieve the condensation, yet it should have enough low impedance so that air can easily flow through it. Underneath the filter 12 and in the chamber 9, there is a void space 14 into which the air outlet pipe 15 is coupled. Thus the polluted air enters the chamber 9 through the inlet pipe 13, diffuses through the filter 12, emerges as pure air in the void 14, and is then discharged through the outlet pipe 15. The purpose of the cryogenic thermometer element 16, which is imbedded in the copper block 11, is to monitor the temperature in the main air purification chamber. It will provide an output electrical signal to operate a relay circuit in the well-known manner, to control a common thermostat mechanism, to control the on and off operation of compressor 1. This control mechanism will enable the maintenance of a fixed desirable operation temperature in the chamber 9, for instance, at $-180°$ C. to $-170°$ C. At this temperature, the air will not be liquefied, but impurities with low condensation temperatures, such as $CF_4$, $C_2H_4$, $CH_4$, NO and CO, will be condensed in the porous structure in the filter 12 and removed from the air stream. They will form thin solid or liquid films, being physically retained by the filter 12. In case excessive condensed liquid pollutants are formed in the filter 12, they may drip down and be collected at the bottom of the void space 14.

The main air purification chamber 9 communicates with the living enclosure 19 by an air circulation system. Its components and functions are shown in FIG. 1 in a self-explanatory manner. The air circulation is driven by an air pump 22. Air supply can come either from the atmosphere by opening the two-way valve 17 or from the enclosure by opening the two-way valve 18. It is then circulated to a dust filter 20, to remove most particulate pollutants contained in the air. Pressure gauge 21 is installed between the filter 20 and the pump 22. Its purpose is to monitor the impedance of the filter 20. In case it is gradually filled up due to dust accumulation, gauge 21 would indicate a higher under-pressure (vacuum), which would call for a replacement of the filter element 20. The air in the outlet of the pump 22, which is pressurized to a moderate pressure of several up to tens of pounds per square inch, is allowed to flow through a number of preliminary air purification chambers 24 and 25. These chambers contain crygenic filters 26 and 27, constructed similar to the cryogenic filter 12 in the main air purification chamber 9.

One side of chambers 24 and 25 is cooled by the cold air circulated from the main air purification chamber via the outlet 15, so that cryogenic temperatures are maintained inside the filters 26 and 27. The cooling is achieved via heat exchangers 28 and 29. They can be a counter-flow type, arranged by allowing the cold air to pass through coiled tubes imbedded inside the filters 26 and 27. The filter 27 is operated at a temperature higher than that of the filter 12, say $-80°$ C. It is thus effective to remove pollutants such as $CO_2$, $N_2O$, $SO_2$, $H_2S$ and $H_2S_2$ by condensation. The filter 26, being cooled by the down stream cold air, which inevitably has a higher temperature due to the cooling of filter 27 and other heat leaks in the plumbing system, remains at an even higher temperature, say $-10°$ to $-20°$ C. Thus it is effective to remove pollutants such as $SO_2$, $SO_3$ and HF by condensation. It also removes the moisture in the air stream by the formation of ice.

It is noted that the exact temperatures of the filters 26 and 27 and the uniformity of the temperatures in them are not critical. Because all the filters 12, 26 and 27 can be worked together in a complimentary manner so that the pollutants can be removed by any one of them. It is also feasible that more than two preliminary air purification chambers, as shown in the figure, can be used. It is understood that all the low temperature parts including the chambers 24 and 25, heat exchangers 28 and 29 and related plumbing in the air circulation system, are put under proper thermal insulation.

The novel feature of the chambers 24 and 25 and the filters 26 and 27 is that during the process of preliminary air purification, they also preliminarily cool down the inlet air, so that the overall energy conservation and the reduction of operation cost are both achieved.

It is anticipated that defrosting of the condensed moisture and pollutants is required from time to time. When there is considerable build-up of the condensation in the cryogenic filters, the pressure gauge 23 will reach a preset high pressure level and send out an electrical signal to turn off the compressor (and therefore the refrigerator) and reverse a two-way valve 32 (normally on), another two-way valve 33 (normally off) and a leak valve 31 (normally off). The warm air will defrost the condensed moisture and pollutants into water and gases respectively. The water is disposed of through the leak valve 31 and the gases are set free into the atmosphere through the valve 33, while the enclosure 19 is isolated from the air circulation. A small heater element 30 can be embedded in the filter 26, to accelerate the defrost process in it. It is also actuated by the same electrical signal.

Under normal operation of the system, the purified air, after passing through the heat exchangers 28 and 29, will warm up to about ambient temperature. The purified air then passes through valve 32 (normally open) and a humidifier 34, before entering the enclosure 19. The humidifier contains some water and a heating element 35 for accelerating vaporization. Attached to enclosure 19, there are a number of gauges for the safety and control of the system. Gauge 40 is a moisture gauge. It controls the on and off switch of the heating element 35 in the humidifier. Gauges 41 and 42 are the oxygen and carbon dioxide concentration monitors respectively. They are used to indicate the safe level of oxygen and the dangerous level of carbon dioxide inside the enclosure. Besides acting as warnings, they can be used to control the on and off operation of the system, mainly the compressor 1 and pump 22, or in case of need of more fresh air, to open valve 17. Gauge 43 is a monitor of selected pollutants. When it indicates a high pollutant content, the air purification system is not functioning properly. Defrosting may be needed.

The system can be operated in two modes separately, or in both modes at the same time. If the two-way valve 18 is closed and the enclosure 19 is open to atmosphere by opening such as windows, the system is operated in a "vented" mode. On the other hand, if valve 18 is open and the enclosure is hermetically sealed, the system is operated in a "recycle" mode. The small enclosure 37 which is attached to but isolated from the main enclosure symbolizes an isolated space (such as a hood or compartment) for other house activities which do not need purified air. Examples are cooking and operation of heater, furnace, laundry dryer etc. These spaces are in communication with atmosphere via vents 38 and 39. This optional design in a house can drastically reduce the requirement for purifying a large volume of air unnecessarily, and therefore increase the cost effectiveness of the operation of the system. It is noted that with the current state-of-the-art of electronic technology, all the monitor devices, such as meters and gauges, and controls, such as heaters, valve, on-off controls etc, can be handles by a small micro-processor, so that the overall operation of the purification system can be optimized with ease.

Figure 2:
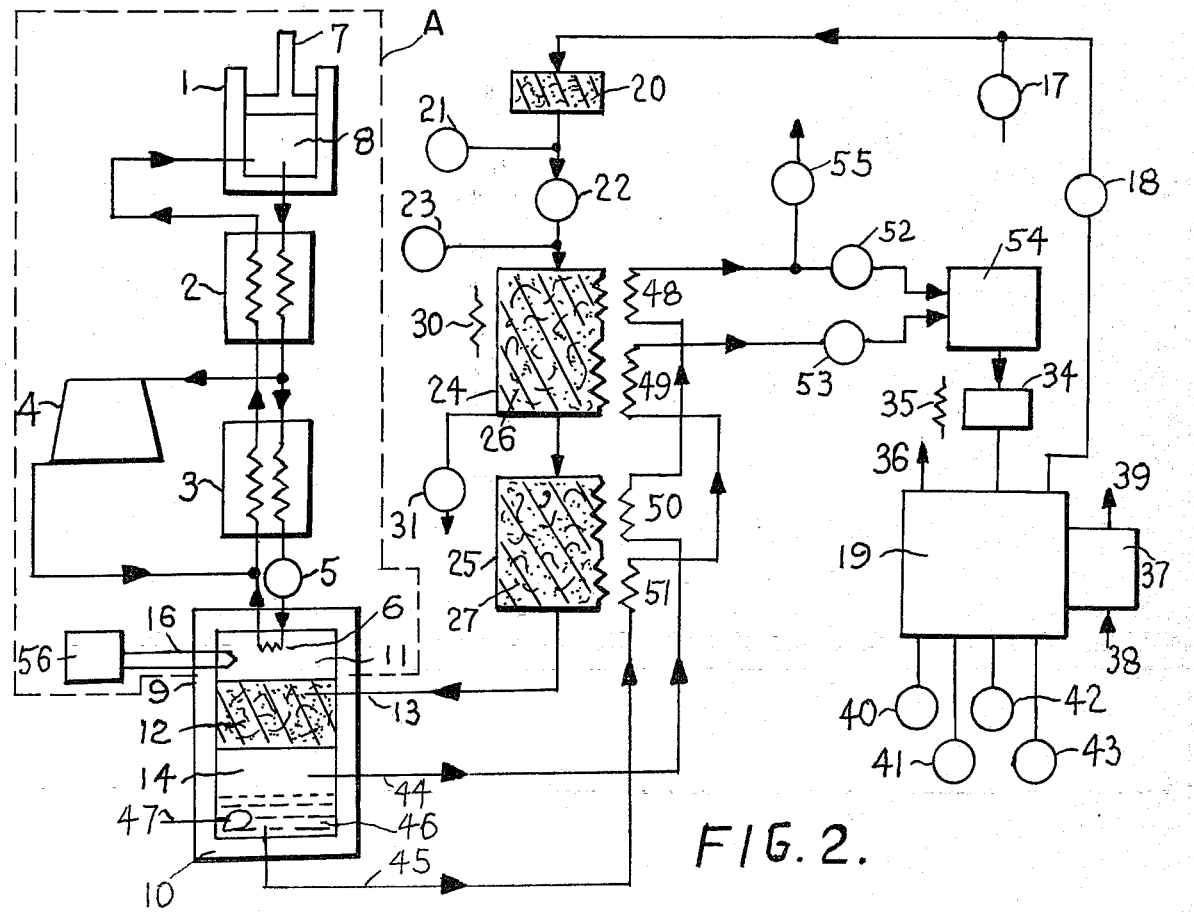
FIG. 2 is a block diagram illustrating another preferred embodiment of the present invention.

FIG. 2 is a block diagram illustrating another embodiment of the present invention. Majority of the components shown in the figure have the same meaning, function and configuration as those shown in FIG. 1, hence their explanations will not be reiterated. The object of this embodiment is to liquefy the oxygen in the incoming air, so that it can be seperated from the nitrogen. It is then introduced into the enclosure 19 in a controlled manner, i.e. to replace that part of oxygen being consumed in the enclosure. Thus the amount of air circulation for purification can be reduced, and the efficiency of the apparatus will be consequently increased. It also permits the air inside the enclosure 19 to become oxygen-richer than the natural air, if it is desirable to do so.

By properly setting the temperature control mechanism 56 attached to the thermometer element 16, the cold end output element 6 of the refrigerator, the copper block 11 and the crygenic filter 12 can be operated at a crygenic temperature below the boiling point of oxygen, say $-184°$ C. to $-190°$ C. Thus oxygen is substantially liquefied and accumulated at the bottom of the main air purification chamber 9 and flows into an output pipe 45. Between the liquid oxygen 46 and the filter 12, there is a void space 14 to allow nitrogen gas to flow into a seperate outlet pipe 44. A liquid detector 47 is used to monitor the liquid oxygen level. When the level is higher than a preset value, it sends an electrical signal to turn off the compressor 1. The cold nitrogen gas and liquid oxygen, after being seperated, then flow through seperate heat exchangers 48, 49, 50 and 51, to cool down the preliminary air purification chambers 24 and 25. They then emerge as gases with temperatures not much different from the ambient temperature. Further flow pattern of the gases is controlled by the two-way valves 52, 53 and 55. The valve 53 controls the oxygen gas to flow into the enclosure 19. It is open or closed, depending upon the oxygen and carbon dioxide concentrations as indicated by the monitors 41 and 42. The two-way valve for nitrogen control 52 is normally closed and the two-way valve 55 is normally open, so that nitrogen is being discharged into the atmosphere. The reverse is true for these two valves, if the enclosure 19 is not completely sealed, i.e. openings 36 such as windows are open and the apparatus is operated in "vented" mode. In that case, both nitrogen and oxygen are mixed in a small mixing chamber 54, and introduced into the enclosure 19 as unpolluted air.

It is noted that by simply resetting the temperature control mechanism 56 attached to the thermometer element 16, the apparatus in this embodiment can be operated as an air purifier in which the oxygen is not being liquefied. Also in both embodiments of the present invention, by resetting the same temperature control mechanism, the apparatus can be operated as an air liquefier, in which both oxygen and nitrogen are liquefied. The latter approach requires more energy to operate, and is therefore not cost effective.

Although two particular embodiments of the invention have been described and illustrated herein, it is recognized that modifications and variations may readily occur to those skilled in the art, and consequently, it is intended that the claims be interpreted to cover such modifications.

REFERENCES

1. H. Rowe, *Philosophic Magazine*, vol. I,. No. 109, page 1042 (1926).

I claim:

1. Apparatus for on-site purification of air for human respiratory consumption in living enclosures such as automobiles, homes, offices, and the like comprising:
   a closed-cycle cryogenic refrigerator communicating with said living enclosure and further having an atmospheric air inlet means communicating with a source of outside air and a purified air outlet means coupled to the living enclosure;
   a plurality of air purification chambers interposed between said atmospheric air inlet means, said refrigerator, and said purified air outlet means and being in communication therewith;
   air circulation means coupled with said inlet and outlet means to provide circulation of air between said source of atmospheric air and said purified air outlet means; and
   a plurality of electrical monitoring instruments and control devices connected with said plurality of said air purification chambers for indicating the status of the air therein and for controlling the flow of atmospheric air and purified air into and out of said apparatus and the living enclosure to provide, economically, a comfortable, relatively pollution free atmosphere in the living enclosure.

2. The apparatus described in claim 1 wherein:
   said refrigerator includes regulatory mechanisms to produce and maintain a low temperature of about $-180°$ C. to $-170°$ C. whereby impurities of low condensation temperatures are removed from the air stream.

3. The apparatus described in claim 1 wherein:
   said purification chambers include means to maintain temperatures of $-180°$ C. to $-10°$ C. therein, so that all gaseous pollutants in the air are substantially removed by condensation, while the air remains in the gaseous state.

4. Apparatus for on-site purification of pure oxygen for human respiratory consumption in living enclosures such as automobiles, homes, offices and the like, said apparatus comprising:
   a closed-cycle cryogenic refrigerator communicating with said living enclosure and further having air inlet means as a source of outside air and an outlet means coupled to said living enclosure;
   means within said cryogenic refrigerator to generate pure oxygen from said atmospheric air;
   a plurality of purification chambers interposed between said air inlet means, said cryogenic refrigerator and said outlet means and being in communication therewith;
   oxygen circulation means coupled with said inlet and outlet means to provide circulation of oxygen between said source of atmospheric air and said outlet means; and a plurality of electrical monitoring instruments and control devices connected with said plurality of said purification chambers for indicating the state of the atmosphere therein and for controlling the flow of atmospheric air and oxygen into and out of said apparatus and the living enclosure to provide, economically, a comfortable relatively pollution-free atmosphere in the living enclosure.

5. The apparatus described in claims 1 or 4 wherein: said purification chambers are constructed from porous materials with high thermal conductivities, selected from the group consisting of metal wools, metal ribbons, sintered metal or ceramics, and powdery materials.

6. The apparatus described in claims 1 or 4 wherein: said purification chambers are being cooled by the cold, purified air/oxygen and nitrogen through heat exchanger mechanisms connected with said chambers so that energy saving can be achieved.

7. The apparatus described in claims 1 or 4 wherein: said monitoring instruments include: pressure gauges, an oxygen concentration monitor in the living enclosure, a carbon dioxide concentration monitor in the living enclosure, a humidity monitor in the living enclosure, a concentration monitor in the living enclosure for selected gaseous pollutants and a cryogenic thermometer in said refrigerator.

8. The apparatus described in claims 1 or 4 including: a means to determine and execute the removal of condensed pollutants and moisture, so that they can be recycled without the need for periodically replacing any components other than the dust filter.

9. The apparatus described in claims 1 or 4 including: a humidifier in the living enclosure to compensate the moisture content lost in the air purification process.

10. The apparatus described in claims 1 or 4 including: means to determine and control the modes of operation: for recycling the air in the living enclosure or taking in fresh air from the atmosphere for purification and for operating on airs from both sources.

11. The apparatus described in claims 1 or 4 including: means disposed in said living enclosure to isolate the air consumption in the enclosure for the purpose other than human respiratory needs, such as required for cooking, heating etc.

12. Means disposed in said apparatus, as described in claims 1 or 4, which means remove the carbon dioxide produced by human respiration in the living enclosure chemical vapors and gases produced by human beings, animals machines, equipment, foods, paints and the like inside said enclosure.

13. The apparatus described in claim 4 wherein: said refrigerator includes regulatory mechanisms to produce and maintain a low temperature of about $-190°$ C. to $-184°$ C.

14. The apparatus described in claim 4 wherein: said purification chambers include means to maintain temperatures of $-190°$ C. to $-10°$ C. therein, so that all gaseous pollutants in the air are substantially removed by condensation and the oxygen in the air is substantially liquefied being essentially seperated from the nitrogen in the air thereby.

15. The apparatus described in claim 4 including: means disposed in said living enclosure to determine and control the amount of oxygen being produced and/the amount of oxygen being introduced into the enclosure.

* * * * *